US008119575B2

(12) United States Patent
Taylor et al.

(10) Patent No.: US 8,119,575 B2
(45) Date of Patent: *Feb. 21, 2012

(54) METHODS AND COMPOSITIONS FOR TREATING SUBTERRANEAN FORMATIONS WITH GELLED HYDROCARBON FLUIDS

(75) Inventors: Robert S. Taylor, Calgary (CA); Gary P. Funkhouser, Duncan, OK (US); Michael A. McCabe, Duncan, OK (US); B. Rāghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 723 days.

This patent is subject to a terminal disclaimer.

(21) Appl. No.: 12/011,263

(22) Filed: Jan. 25, 2008

(65) Prior Publication Data

US 2008/0146463 A1   Jun. 19, 2008

Related U.S. Application Data

(63) Continuation-in-part of application No. 10/767,647, filed on Jan. 29, 2004, now Pat. No. 7,328,744, which is a continuation-in-part of application No. 10/409,240, filed on Apr. 8, 2003, now Pat. No. 7,314,850, which is a continuation-in-part of application No. 09/792,165, filed on Feb. 23, 2001, now Pat. No. 6,544,934.

(51) Int. Cl.
    *C09K 8/00*   (2006.01)
(52) U.S. Cl. .................... 507/238; 166/308.4
(58) Field of Classification Search ............ 166/308.4
    See application file for complete search history.

(56) References Cited

U.S. PATENT DOCUMENTS

| 2,983,678 | A |   | 5/1961  | Pellegrini, Jr. et al. | 252/32.5  |
|-----------|---|---|---------|------------------------|-----------|
| 3,494,949 | A |   | 2/1970  | Monroe et al.          | 260/448   |
| 3,505,374 | A |   | 4/1970  | Monroe                 | 260/439   |
| 3,522,178 | A |   | 7/1970  | Peschko et al.         |           |
| 3,575,589 | A |   | 4/1971  | Monroe                 | 252/32.5  |
| 3,730,273 | A | * | 5/1973  | Wilson                 | 166/269   |
| 3,757,864 | A |   | 9/1973  | Crawford et al.        | 166/308   |
| 3,798,162 | A |   | 3/1974  | Dicker, Jr. et al.     | 252/32.5  |
| 3,900,070 | A |   | 8/1975  | Chatterji et al.       | 166/308   |
| 3,990,978 | A |   | 11/1976 | Hill                   | 252/8.55  |
| 4,007,128 | A |   | 2/1977  | Poklacki               | 252/316   |
| 4,104,173 | A |   | 8/1978  | Gay et al.             | 252/8.55  |
| 4,153,649 | A |   | 5/1979  | Griffin, Jr.           | 260/950   |
| 4,200,539 | A |   | 4/1980  | Burnham et al.         | 507/238   |
| 4,200,540 | A |   | 4/1980  | Burnham                | 252/8.55  |
| 4,316,810 | A |   | 2/1982  | Burnham                | 507/238   |
| 4,382,003 | A |   | 5/1983  | Kucera et al.          | 252/8.55  |
| 4,480,696 | A |   | 11/1984 | Almond et al.          | 166/308   |
| 4,507,213 | A |   | 3/1985  | Daccord et al.         | 507/238   |
| 4,622,155 | A |   | 11/1986 | Harris et al.          | 252/8.551 |
| 4,741,401 | A |   | 5/1988  | Walles et al.          | 166/300   |
| 4,787,994 | A |   | 11/1988 | Thorne et al.          | 252/32.5  |
| 4,795,574 | A |   | 1/1989  | Syrinek et al.         | 252/8.551 |
| 4,830,766 | A |   | 5/1989  | Gallup et al.          | 252/8.552 |
| 4,877,894 | A |   | 10/1989 | Huddleston             | 558/113   |
| 4,946,578 | A |   | 8/1990  | Clough et al.          |           |
| 5,057,233 | A |   | 10/1991 | Huddleston             | 252/8.551 |
| 5,063,997 | A | * | 11/1991 | Pachla et al.          | 166/279   |
| 5,110,485 | A |   | 5/1992  | Huddleston             | 252/8.551 |
| 5,190,675 | A |   | 3/1993  | Gross                  | 507/238   |
| 5,202,035 | A |   | 4/1993  | Huddleston             | 252/8.551 |
| 5,271,464 | A |   | 12/1993 | McCabe                 | 166/295   |
| 5,417,287 | A |   | 5/1995  | Smith et al.           | 166/308   |
| 5,419,183 | A |   | 5/1995  | Keys                   | 73/49.5   |
| 5,514,645 | A |   | 5/1996  | McCabe et al.          | 507/238   |
| 5,571,315 | A |   | 11/1996 | Smith et al.           | 106/285   |
| 5,614,010 | A |   | 3/1997  | Smith et al.           | 106/285   |
| 5,622,919 | A |   | 4/1997  | Brezinski et al.       | 507/90    |
| 5,647,900 | A |   | 7/1997  | Smith et al.           | 106/285   |
| 5,649,596 | A |   | 7/1997  | Jones et al.           | 166/300   |
| 5,674,817 | A |   | 10/1997 | Brezinski et al.       | 507/258   |
| 5,718,745 | A |   | 2/1998  | Itoh et al.            | 106/1.22  |

(Continued)

FOREIGN PATENT DOCUMENTS

EP   0 448 218 B1   2/1991

(Continued)

OTHER PUBLICATIONS

Tetrahedron Letters, vol. 35, No. 24, pp. 4223-4226, Entitled "Syntheseis of Alkyl Phosphinic Acids From Silyl Phosphonites and Alkyl Halides" by E. Andrew Boyd and Andrew C. Regan, 1994.

Department of Organic Chemistry, The Unviersity of Liverpool Received Apr. 10, 1958, Entitled "Unsymmetrical Dialkylphosphinic Acids" by P.C. Crofts and I.S. Fox.

(Continued)

*Primary Examiner* — Alicia Toscano

(74) *Attorney, Agent, or Firm* — Robert A. Kent; McDermott Will & Emery LLP

(57) ABSTRACT

Among other things, methods of treating a subterranean formation with gelled hydrocarbon fluids are provided. In certain embodiments, these methods comprise the steps of providing a gelled liquid hydrocarbon treatment fluid comprising a liquid hydrocarbon and a gelling agent that comprises a polyvalent metal salt of an organophosphonic acid ester or a polyvalent metal salt of an organophosphinic acid, and treating the subterranean formation with the gelled liquid hydrocarbon treatment fluid. The gelled liquid hydrocarbon treatment fluids of the present invention are suitable for use in subterranean treatment operations, such as subterranean stimulation and sand control treatments like fracturing and gravel packing, that may be carried out in subterranean formations for the production of hydrocarbons. The compositions and methods of the present invention also may be suitable, for example, to be used as plugging agents, well bore cleanup fluids, viscous sweep fluids, or insulating fluids to be used in associated methods.

16 Claims, No Drawings

U.S. PATENT DOCUMENTS

| | | | |
|---|---|---|---|
| 5,807,812 A | 9/1998 | Smith et al. | 507/238 |
| 5,807,821 A | 9/1998 | Lampe | |
| 5,846,915 A | 12/1998 | Smith et al. | 507/269 |
| 6,004,908 A | 12/1999 | Graham et al. | 507/238 |
| 6,054,417 A | 4/2000 | Graham et al. | 507/238 |
| 6,147,034 A | 11/2000 | Jones et al. | 507/238 |
| 6,149,693 A | 11/2000 | Geib | 44/270 |
| 6,169,058 B1 | 1/2001 | Le et al. | 507/222 |
| 6,187,720 B1 | 2/2001 | Acker et al. | 507/238 |
| 6,261,998 B1 | 7/2001 | Amin et al. | 507/238 |
| 6,271,409 B1 | 8/2001 | Geib | 558/177 |
| 6,297,201 B1 | 10/2001 | Geib | 507/244 |
| 6,342,468 B1 | 1/2002 | Geib | 507/238 |
| 6,387,137 B1 | 5/2002 | Geib | 44/270 |
| 6,511,944 B2 | 1/2003 | Taylor et al. | 507/237 |
| 6,544,934 B2 | 4/2003 | Taylor et al. | 507/238 |
| 6,849,581 B1 * | 2/2005 | Thompson et al. | 507/118 |
| 6,986,391 B2 | 1/2006 | Funkhouser et al. | |
| 7,066,262 B2 | 6/2006 | Funkhouser | |
| 7,163,060 B2 | 1/2007 | Weiss et al. | |
| 7,168,490 B2 * | 1/2007 | Taylor et al. | 166/278 |
| 7,293,611 B2 * | 11/2007 | Taylor et al. | 166/308.4 |
| 7,314,850 B2 * | 1/2008 | Taylor et al. | 507/238 |
| 7,328,744 B2 * | 2/2008 | Taylor et al. | 166/279 |
| 7,341,103 B2 * | 3/2008 | Taylor et al. | 166/278 |
| 7,534,745 B2 * | 5/2009 | Taylor et al. | 507/128 |
| 2003/0228985 A1 | 12/2003 | Taylor et al. | 507/238 |
| 2006/0096756 A1 | 5/2006 | Weiss et al. | |
| 2008/0146463 A1 | 6/2008 | Taylor et al. | |

FOREIGN PATENT DOCUMENTS

| | | |
|---|---|---|
| EP | 0 919 695 A2 | 11/1998 |
| EP | 0 919 695 A3 | 11/1998 |
| EP | 1 236 863 A1 | 2/2002 |
| EP | 1 234 948 A1 | 8/2002 |
| EP | 1 236 863 B1 | 5/2004 |
| EP | 1 559 867 A1 | 8/2005 |
| WO | WO 97/27266 | 7/1976 |
| WO | WO 98/20088 | 5/1998 |
| WO | WO 98/45573 | 10/1998 |

OTHER PUBLICATIONS

Tetrahedron Letters, vol. 33, No. 6, pp. 813-816, Entitled "Synthesis of Y-Keto-substituted Phosphinic Acids from BIS (Trimethylsilyl) Phosphonite and A,B-Unsaturated Ketones" by E. Andrew Boyd and Andrew C. Regan, 1992.

Foreign Communication From a Related Counterpart Application, May 31, 2005.

* cited by examiner

METHODS AND COMPOSITIONS FOR TREATING SUBTERRANEAN FORMATIONS WITH GELLED HYDROCARBON FLUIDS

CROSS-REFERENCE TO RELATED APPLICATIONS

This application is a continuation-in-part of U.S. patent application Ser. No. 10/767,647, filed Jan. 29, 2004, now U.S. Pat. No. 7,328,744 entitled "Methods and Compositions for Treating Subterranean Formations with Gelled Hydrocarbon Fluids," which is a continuation-in-part of U.S. patent application Ser. No. 10/409,240, filed Apr. 8, 2003, now U.S. Pat. No. 7,314,850 entitled "Methods and Compositions for Treating Subterranean Formations with Gelled Hydrocarbon Fluids," which is a continuation-in-part of U.S. patent application Ser. No. 09/792,165 filed Feb. 23, 2001, entitled "Methods and Compositions for Treating Subterranean Formations with Gelled Hydrocarbon Fluids," now U.S. Pat. No. 6,544,934, the relevant disclosures of which are herein incorporated by reference.

BACKGROUND

This invention relates to gelled liquid hydrocarbon treatment fluids and methods of their use and preparation.

Gelled liquid hydrocarbon fluids have been utilized in treating subterranean formations penetrated by well bores, e.g., for stimulation or sand control treatments such as fracturing or gravel packing, respectively. In fracturing treatments, a gelled liquid hydrocarbon fracturing fluid that may comprise particulate material, often referred to as proppant, e.g., sand, suspended therein is pumped through a well bore into a subterranean formation at a rate and pressure such that one or more fractures are formed or enhanced in a portion of the formation. Proppant material may be deposited in the fractures, inter alia, to prevent the formed fractures from closing, thereby maintaining conductive channels remain through which produced fluids can flow to the well bore. At a desired time, the viscosity of the gelled liquid hydrocarbon fluid may be reduced, or "broken," and the fluid may be recovered.

Similarly, sand control operations, such as gravel packing, use gelled liquid hydrocarbon fluids, often referred to as gravel pack fluids. Gravel pack fluids usually are used to suspend gravel particles for delivery to a desired area in a well bore, e.g., near unconsolidated or weakly consolidated formation particulates, to form a gravel pack to enhance sand control. One common type of gravel packing operation involves placing a gravel pack screen in the well bore and packing the annulus between the screen and the well bore with gravel of a specific size designed to prevent the passage of formation sand. The gravel, inter alia, acts to prevent the particulates from occluding the screen or migrating with the produced fluids, and the screen, inter alia, acts to prevent the gravel from entering the production tubing. Once the gravel pack is substantially in place, the viscosity of the gravel pack fluid often is reduced to allow it to be recovered or produced back from the well bore.

Polyvalent metal salts of orthophosphoric acid esters have been utilized as gelling agents for forming high-viscosity gelled liquid hydrocarbon treatment fluids. Such gelled liquid hydrocarbon treatment fluids often have included particulate materials such as proppant or gravel, and oftentimes delayed breakers for causing the treatment fluids to break into relatively thin fluids so that the treatment fluids may be produced back. Descriptions of such high-viscosity gelled liquid hydrocarbon treatment fluids and methods of their use are set forth at least in part in U.S. Pat. No. 4,622,155 issued to Harris et al. on Nov. 11, 1986, and U.S. Pat. No. 5,846,915 issued to Smith et al. on Dec. 8, 1998, the relevant disclosures of which are herein incorporated by reference.

While high-viscosity gelled liquid hydrocarbon treatment fluids and methods have been used successfully in some instances, problems in downstream processes have been encountered as a result of the use of the phosphoric acid ester gelling agent. For example, in recent years, plugging of refinery towers (which often process hydrocarbons produced from formations treated with gelled liquid hydrocarbon fracturing fluids) has caused many expensive, unplanned shut-downs of those towers. The plugging material is high in phosphorus and has been attributed to the phosphoric acid esters used as gelling agents in conventional gelled liquid hydrocarbon treatment fluids used during production of the hydrocarbons from a subterranean formation. The phosphoric acid esters are thought to contribute volatile phosphorus, which may condense on distillation tower trays, resulting in plugging of such trays, which may result in shut-downs of the towers. The volatile phosphorus also may carry over the tops of the distillation towers causing contamination of the hydrocarbon products produced.

SUMMARY

This invention relates to gelled liquid hydrocarbon treatment fluids and methods of their use and preparation.

In one embodiment, the present invention provides a method comprising: providing a gelled liquid hydrocarbon treatment fluid comprising a liquid hydrocarbon and a gelling agent that comprises a polyvalent metal salt of an organophosphinic acid; and treating a portion of a subterranean formation with the gelled liquid hydrocarbon treatment fluid.

In another embodiment, the present invention provides a method of fracturing a portion of a subterranean formation comprising: providing a gelled liquid hydrocarbon fracturing fluid comprising a gelling agent that comprises a polyvalent metal salt of an organophosphinic acid; and contacting the portion of the subterranean formation with the gelled liquid hydrocarbon fracturing fluid under conditions effective to create or enhance at least one fracture in the subterranean formation.

In another embodiment, the present invention provides a method of providing sand control to a portion of a subterranean formation comprising: providing a gelled liquid hydrocarbon gravel pack fluid that comprises gravel particulates and a gelling agent that comprises a polyvalent metal salt of an organophosphinic acid; and contacting the portion of the subterranean formation with the gelled liquid hydrocarbon gravel pack fluid so as to form a gravel pack near the portion of the subterranean formation.

The features and advantages of the present invention will be apparent to those skilled in the art. While numerous changes may be made by those skilled in the art, such changes are within the spirit of the invention.

DESCRIPTION OF PREFERRED EMBODIMENTS

This invention relates to gelled liquid hydrocarbon treatment fluids and methods of their use and preparation. The gelled liquid hydrocarbon treatment fluids of the present invention are suitable for use in subterranean treatment operations, such as subterranean stimulation and sand control treatments, such as fracturing and gravel packing, that may be carried out in subterranean formations. The compositions and methods of the present invention also may be suitable, for example, to be used as plugging agents, well bore cleanup fluids, viscous sweep fluids, or insulating fluids to be used in associated methods.

The gelled liquid hydrocarbon compositions of the present invention comprise a gelling agent that comprises a polyvalent metal salt of an organophosphonic acid ester or a polyvalent metal salt of an organophosphinic acid. The term "salt" as used herein and in related applications refers to polyvalent metal ion salts that can be formed directly from an organophosphonic acid ester (or an organophosphinic acid) by a metathesis reaction comprising an alkali metal or ammonium salt of the organophosphonic acid ester (or the organophosphinic acid), or by a metathesis reaction comprising an organophosphonic acid dialkyl ester (or organophosphinic acid alkyl ester). Unlike the phosphoric acid esters utilized heretofore, the polyvalent metal salts of the gelling agents of the present invention, inter alia, do not decompose or disassociate as readily as conventional phosphoric acid ester gelling agents. Thus, they may not pose as large of a potential problem for downstream processing. Optionally, the gelling agents of the present invention may comprise water and/or a base if desired.

In certain embodiments, the gelled liquid hydrocarbons of the present invention comprise a polyvalent metal salt of an organophosphonic acid ester or polyvalent metal salt of an organophosphinic acid. Suitable organophosphonic acid esters have the formula:

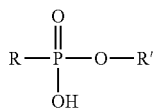

wherein R comprises a hydrocarbon group having from about 1 to about 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof; and R' comprises a hydrocarbon group having from about 1 to about 6 carbon atoms. If R is a relatively small group, then R' may comprise a larger hydrocarbon group similar to that listed above with respect to R such as linear or branched alkyl, alkenyl, aryl, alkylaryl, arylalkyl, cycloalkyl, alkyl ether, aryl ether, alkyl aryl ether group, or a mixture thereof that may have about 1 to about 30 carbon atoms. In choosing a suitable R and R', one should be mindful that if R and R' are both relatively bulky groups (e.g., if R and R' are both 2-ethylhexyl groups), then an adequate gelled liquid hydrocarbon may not form. Techniques that can be utilized for the preparation of organophosphonic acid esters useful in accordance with this invention include, for example, those described in U.S. Pat. No. 3,798,162 issued to Dickert, Jr. on Mar. 19, 1974, the relevant disclosure of which is incorporated herein by reference.

Suitable organophosphinic acids have the formula:

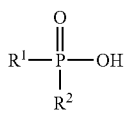

wherein $R^1$ may comprise a linear or branched hydrocarbon group having from about 1 to 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof; and $R^2$ may comprise a linear or branched hydrocarbon or aromatic group having from about 1 to about 6 carbon atoms. In choosing a suitable $R^1$ and $R^2$, one should be mindful that if $R^1$ and $R^2$ are both relatively bulky groups, then an adequate gelled liquid hydrocarbon may not form. Techniques which can be used for the preparation of an organophosphinic acid useful in accordance with this invention are well known. For example, the organophosphinic acid can be prepared from the reaction of alkylphosphonic dichloride with a Grignard reagent as reported by Crofts and Fox in "Unsymmetrical Dialkylphosphinic Acids" *J. Chem. Soc.* 1958, 2995-2997, the relevant disclosure of which is incorporated herein by reference. An exemplary reaction sequence is illustrated below:

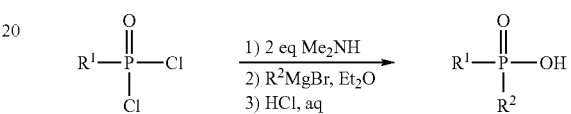

Alternatively, unsymmetrical organophosphinic acids can be prepared in a one-pot synthesis using the method of Boyd et al. in "Synthesis of γ-keto-substituted phosphinic acids from bis(trimethylsilyl)phosphonite and α,β-unsaturated ketones," *Tetrahedron Lett.*, 1992, 33, 813-816 and Boyd, E. A.; Regan, A. C.; James, K. "Synthesis of Alkyl Phosphinic Acids from Silyl Phosphonites and Alkyl Halides," *Tetrahedron Lett.*, 1994, 35, 4223-4226, the relevant disclosures of which are incorporated herein by reference. An exemplary reaction sequence is shown below:

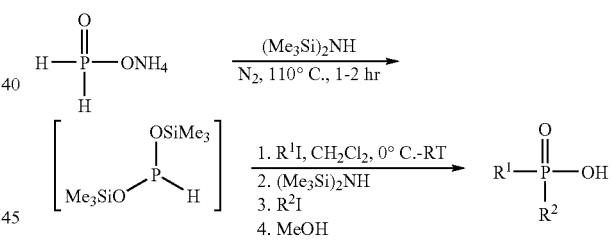

Suitable activator compositions comprise a source of polyvalent metal ions suitable for forming the polyvalent metal salts of organophosphonic acid esters or organophosphinic acids of the gelling agents of the present invention. Examples of such suitable ions include, but are not limited to, aluminum ions, gallium ions, lanthanum ions, ruthenium ions, iron ions, or lanthanide rare earth series ions. Preferred polyvalent metal ions have a +3 oxidation state. When ferric iron is utilized to form the gelling agent, the source of the ions is preferably ferric sulfate or ferric chloride, ferric sulfate being preferred. The ferric iron salt is typically mixed with amines, surfactants and water to form a liquid activator composition. An example of a commercially available ferric iron activator composition is "EA-3™" sold by Ethox Chemicals, Inc. of Greenville, S.C. When an aluminum compound is utilized, it is preferably selected from aluminum chloride, sodium aluminate, or aluminum isopropoxide. In certain embodiments, the ratio of metal to phosphorus in a gelled liquid hydrocarbon treatment fluid should be about 1:3; in other embodiments, the metal to phosphorus ratio may be about 2:3. Activator compositions also may comprise amines, surfactants, water, or other suitable components.

The polyvalent metal salts of organophosphonic acid esters or organophosphinic acids of the gelling agents of the present invention may be formed by any suitable method, which will be apparent to those ordinarily skilled in the art upon reading this disclosure.

The liquid hydrocarbon utilized to form the gelled liquid hydrocarbon treatment fluids of the present invention can comprise any suitable liquid hydrocarbon including, but not limited to, α-olefins, internal olefins, alkanes, aromatic solvents, cycloalkanes, liquefied petroleum gas, kerosene, diesel oil, gas oil (also known as gas condensate), fuel oil, other petroleum distillates, certain mixtures of crude oil, or mixtures thereof. Liquid hydrocarbons that may be specifically designed for use with $CO_2$ are generally preferred in some instances, e.g., a dry gas well. An example of a suitable liquid hydrocarbon is commercially available from the Trysol Corporation of Sundre, Alberta, Canada under the trade name "FRACSOL™."

If desired, enhancers may be added, inter alia, to provide alkalinity, improve the stability of the polyvalent metal ions in the activator composition, and/or improve the dispersability of the metal ions in the hydrocarbon liquid so as to facilitate the formation of the gelled liquid hydrocarbon treatment fluid. Preferred enhancers should provide alkalinity and should facilitate the gelation of the liquid hydrocarbon. Suitable enhancers may be defined by the general formula $C_nH_mO_xN_y$, wherein n is from about 1 to about 50, m is from about 0 to about the number of hydrogens necessary to satisfy the valence requirements of the enhancer compound, x is from about 1 to about 10 (preferably around 2), and y is from about 0 to about 10 (preferably under 3). Suitable examples would be where the ratio of C to N in the enhancer ranges from about 1:1 to about 50:1, and C to O from about 1:1 to about 20:1. Specific examples include ethoxylated amines, like triethanolamines, N,N-dibutyl ethanol amines, and oxyalkylated di-$C_2$-$C_8$ alkyl amines; N,N-di-loweralkyl fatty amines; oxyalkylated fatty amine monoammonium citrate; bis(hydroxyethyl) tallowamine; and ethoxylated dehydroabietylamine. Mixtures of such suitable enhancers also are suitable. An example of a suitable enhancer is a surfactant. Surfactants may be added to facilitate the formation of a gelled liquid hydrocarbon treatment fluid. Surfactants may decrease the gelation time of the gelled liquid hydrocarbon because they may allow for a better dispersion of the metal ions in the hydrocarbon fluid. Suitable surfactants that may be used include basic surfactants, especially those that may comprise an amine group. Use of about 0.1% to about 10.0% of a suitable surfactant based on the amount of the gelling agent may be beneficial, inter alia, to help speed formation of the gelled liquid hydrocarbon fluid or to impart desirable rheological characteristics. Some specific examples of suitable surfactants include imidazoline, a fatty acid soap, a fatty acid, dioctyl sulphosuccinate, sodium alkyl benzene sulphonate, fatty acid esters, fatty acid alkanolamides, and amido betaines.

In certain embodiments, the gelled hydrocarbon treatment fluids of the present invention may comprise particulate materials like proppant or gravel that can be utilized in, for example, fracturing or gravel packing operations. Suitable particulate materials include, but are not limited to, graded walnut or other nut shells, resin-coated walnut or other nut shells, graded sand, resin-coated sand, sintered bauxite, various particulate ceramic materials, glass beads, various particulate polymeric materials and the like. The particular size of the particulate material employed may depend on the particular application for which the particulate materials are being used, characteristics of the subterranean formation, characteristics of the particular gelled liquid hydrocarbon treatment fluid being used, as well as other variables. Generally, the particulate sizes may vary in the range of from about 2 to about 200 mesh, U.S. Sieve Series scale. One of ordinary skill in the art with the benefit of this disclosure will be able to choose an appropriate particulate material for a given application.

In addition, in a preferred embodiment, if water is not already contained in the hydrocarbon liquid, or added thereto as a component of a component, e.g., in an activator composition or an enhancer, water may be added in an amount, for example, of about 0.05% or greater by the total treatment fluid volume. The presence of the water, inter alia, may be used beneficially in the compositions and methods of the present invention, for example, to allow for slowly water soluble or encapsulated breakers to be dissolved or released that may be used to reduce the viscosity of the gelled liquid hydrocarbon treatment fluid of the present invention when desired. See, for example, Smith et al. U.S. Pat. No. 5,846,915 issued on Dec. 8, 1995, the relevant disclosure of which is incorporated herein by reference.

If a gelled liquid hydrocarbon treatment fluid of the present invention is being used in an application wherein it may be desirable to eventually reduce the viscosity of the treatment fluid, for example, to recover it from the subterranean formation at a desired time, then a suitable breaker may be included in or added to the fluid. Any breaker that is able to reduce the viscosity of the gelled liquid hydrocarbon treatment fluid when desired is suitable for use in the compositions and methods of the present invention. In certain preferred embodiments, delayed gel breakers that will react with the treatment fluid after a desired delay period may be used. Suitable delayed gel breakers can be materials that are slowly soluble in water, those that are encapsulated, or those that are otherwise designed to slowly solubilize in the fluid. In certain preferred embodiments wherein these types of breakers are used, the breaking of the gel does not take place until the slowly soluble breakers are at least partially dissolved in the water. Examples of such slowly soluble breakers are given in U.S. Pat. No. 5,846,915 issued to Smith et al. on Dec. 8, 1998. Hard-burned magnesium oxide, especially that having a particle size which will pass through a 200 mesh Tyler screen, is a preferred delayed gel breaker. Other breakers such as alkali metal carbonates, alkali metal bicarbonates, alkali metal acetates, other alkaline earth metal oxides, alkali metal hydroxides, amines, weak acids and the like can be encapsulated with slowly water soluble or other similar encapsulating materials so as to make them act after a desired delay period. Such materials are well known to those skilled in the art and function to delay the breaking of the gelled liquid hydrocarbon for a required period of time. Examples of water soluble and other similar encapsulating materials that may be suitable include, but are not limited to, porous solid materials such as precipitated silica, elastomers, polyvinylidene chloride (PVDC), nylon, waxes, polyurethanes, polyesters, crosslinked partially hydrolyzed acrylics and the like. Of the slowly soluble or encapsulated breakers mentioned, hard-burned magnesium oxide, which may be commercially available from Clearwater Inc. of Pittsburgh, Pa., is preferred. In certain embodiments, when a polyvalent metal salt of an organophosphonic acid ester and an alkaline breaker are utilized, e.g., magnesium oxide, an initial increase in the viscosity of the gelled hydrocarbon liquid may be achieved, after which the gel is broken. If used, the delayed gel breaker may be present in the gelled hydrocarbon liquids of the present invention in an amount in the range of from about 0.01% to about 3% w/v, more preferably in an amount in the range of from about 0.05% to about 1% w/v. "w/v" as used herein refers to the weight of the component based on the volume of the liquid hydrocarbon that is present in the treatment fluid.

Another type of breaker which can be utilized when the gelling agent is a ferric iron polyvalent metal salt of an organophosphonic acid ester or a ferric iron polyvalent metal salt of the organophosphinic acid is a reducing agent that reduces ferric iron to ferrous iron. Of the various oxidation states of iron, ferric iron is capable of forming a viscosifying coordination salt with an organophosphonic acid ester or organophosphinic acid, therefore the salt may be disassociated by reducing the ferric iron to the ferrous state. The disassociation may cause the gelled liquid hydrocarbon treatment fluid to break. Examples of reducing agents which can be utilized include, but are not limited to, stannous chloride, thioglycolic acid, hydrazine sulfate, sodium diethyldithiocarbamate, sodium dimethyldithiocarbamate, sodium hypophosphite, potassium iodide, hydroxylamine hydrochloride, 2-mercaptoethanol, ascorbic acid, sodium thiosulfate, sodium dithionite, and sodium sulfite. Of these, the preferred reducing agents for use at a temperature of about 90° F. are stannous chloride, thioglycolic acid, hydrazine sulfate, sodium diethyldithiocarbamate, and sodium dimethyldithiocarbamate. The most preferred reducing agent is thioglycolic acid, which may be delayed by salt formation or encapsulation. As mentioned above in connection with other breakers that can be used, the reducing agent utilized also can be delayed by encapsulating it with a slowly water soluble or other similar encapsulating material. If used, the gel breaker is generally present therein in an amount in the range of from about 0.01% to about 3% w/v, more preferably in an amount in the range of from about 0.05% to about 1% w/v.

Gelled liquid hydrocarbon treatment fluids of the present invention may be prepared by any suitable method. For instance, a gelled liquid hydrocarbon treatment fluid comprising a gelling agent that comprises a polyvalent metal salt of an organophosphonic acid ester or an organophosphinic acid may be produced at the well site. In an example of such an on-site method, an organophosphonic acid ester or an organophosphinic acid may be added to a suitable amount of an activator composition that comprises a source of polyvalent metal ions so as to form a gelling agent comprising polyvalent metal salt of an organophosphonic acid ester or a polyvalent metal salt of an organophosphinic acid. This may be done in a liquid hydrocarbon fluid so that the resultant gelling agent may gel the liquid hydrocarbon fluid. In certain embodiments, the ratio of metal to phosphorus in the gelled liquid hydrocarbon treatment fluid should be about 1:3; in other embodiments, the metal to phosphorus ratio may be about 2:3.

A gelling agent of the present invention that comprises a polyvalent metal salt of an organophosphonic acid ester or a polyvalent metal salt of an organophosphinic acid may be formed off-site and then added to the liquid hydrocarbon at the well site so as to form a gelled liquid hydrocarbon treatment fluid. In an example of such a method, the polyvalent metal salt may be prepared by any method that is suitable for forming solid salt particulates (e.g., flakes, pellets, or other particulates) that later can be introduced to a liquid hydrocarbon fluid. The polyvalent metal salt particulates may be transported to the well site where they can be added to a liquid hydrocarbon fluid. In some embodiments of such methods, the liquid hydrocarbon fluid may be pre-gelled or partially gelled using any suitable technique. In one embodiment of such a technique, after the salt particulates are added to the liquid hydrocarbon fluid, no significant increase in the viscosity of the liquid hydrocarbon fluid may be realized until the temperature of the fluid is sufficient to enable the salt particulates to dissolve in the liquid hydrocarbon fluid to eventually increase its viscosity.

Another method of preparing a gelled liquid hydrocarbon treatment fluid of the present invention comprises forming an initial liquid hydrocarbon gel by adding a gelling agent that comprises a polyvalent metal salt of an organophosphonic acid ester or a polyvalent metal salt of an organophosphinic acid to a liquid hydrocarbon fluid to form an initial gel. At a desired time, an additional quantity of a gelling agent that may comprise a polyvalent metal salt of an organophosphonic acid ester or a polyvalent metal salt of an organophosphinic acid may be added to the initial gel, for example, as it is pumped into a well bore penetrating a subterranean formation, to form a more viscous gel.

Another example of a method for forming the gelled liquid hydrocarbon treatment fluids of the present invention involves preparing a liquid hydrocarbon gel having a high concentration of a polyvalent metal salt of an organophosphonic acid ester or a polyvalent metal salt of an organophosphinic acid. This gel may be highly viscous. This highly viscous gel may be prepared off-site and then delivered to the location of use at a desired time. At the location, the highly viscous gel may be diluted with a hydrocarbon if desired for use (for instance, if the gel is to be used in a fracturing or sand control treatment method).

Although certain methodologies of making a gelled liquid hydrocarbon treatment fluid of the present invention have been discussed in detail, one should note that the order of addition of each component is not critical, and therefore, other methods are suitable as well.

A preferred method of preparing a gelled liquid hydrocarbon fluid of this invention comprises adding an activator composition comprising a source of polyvalent metal ions and an organophosphonic acid ester to a liquid hydrocarbon, the organophosphonic acid ester having the formula:

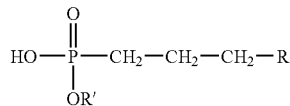

where R represents a hydrocarbon group having the general formula $C_nH_{2n+1}$, where n is from about 3 to about 21 and R' preferably comprises a methyl or ethyl group, or adding an organophosphinic acid having the formula:

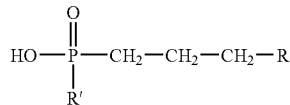

where R represents a hydrocarbon group having the general formula $C_nH_{2n+1}$, where n is from about 3 to about 21 and R' preferably is either methyl or ethyl, so as to form a suitable polyvalent metal salt thereof that will gel the liquid hydrocarbon. In a preferred embodiment, the source of polyvalent metal ions comprises aluminum or iron. The resultant polyvalent metal salt of the organophosphonic acid ester or the polyvalent metal salt of the organophosphinic acid may be present in an amount in the range of from about 0.1% to about 10.0% w/v, more preferably in an amount in the range of from about 0.2% to about 2% w/v. Optionally, a breaker may be added to the gelled liquid hydrocarbon fluid. If a delayed gel breaker is used, the delayed gel breaker may be present in the hydrocarbon liquid in an amount in the range of from about 0.01% to about 3% by weight of the hydrocarbon liquid, more preferably in an amount in the range of from about 0.05% to about 1%.

A preferred gelled liquid hydrocarbon composition of this invention comprises a hydrocarbon liquid and a gelling agent that comprises a polyvalent metal salt of an organophosphonic acid ester or a polyvalent metal salt of an organophosphinic acid. The gelled liquid hydrocarbon composition may comprise water and/or a base. The gelled liquid hydrocarbon composition optionally may comprise an enhancer and/or a breaker. In certain embodiments, the enhancer comprises a surfactant. In certain embodiments, the breaker is a delayed gel breaker. The delayed gel breaker may comprise a reducing agent that is capable of reducing ferric iron to ferrous iron, and it may be encapsulated with a slowly water soluble or other similar encapsulating material.

A preferred hydrocarbon liquid gelling agent of this invention comprises a ferric iron or aluminum polyvalent metal salt of an organophosphonic acid ester, the organophosphonic acid ester having the formula:

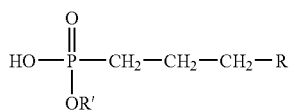

where R represents a hydrocarbon group having the general formula $C_nH_{2n+1}$, where n is from about 3 to about 21 and R' preferably is methyl or ethyl, or an organophosphinic acid having the formula:

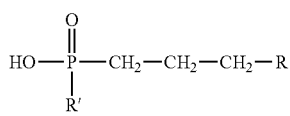

where R represents a linear or branched alkyl chain having the general formula $C_nH_{2n+1}$, where n is from about 1 to about 21, and R' preferably is a methyl or ethyl. A preferred hydrocarbon liquid gelling agent comprises a ferric iron polyvalent metal salt of an organophosphonic acid ester, the ester having the formula:

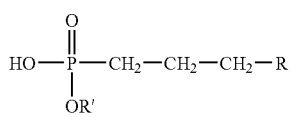

where R represents a linear or branched alkyl chain having the general formula $C_nH_{2+1}$, where n is from about 1 to about 21 and R' preferably is a methyl or ethyl group, or an organophosphinic acid having the formula:

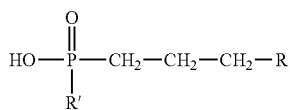

where R represents a linear or branched alkyl chain having the general formula $C_nH_{2n+1}$, where n is from about 1 to about 21 and R' preferably is a methyl or ethyl group.

In a treatment fluid embodiment, a gelling agent comprising an organophosphonic acid ester or an organophosphinic acid may be added to the liquid hydrocarbon along with an activator composition that comprises a source of polyvalent metal ions to gel the liquid hydrocarbon. An exemplary method of the present invention of treating a subterranean formation comprises the steps of: providing a gelled liquid hydrocarbon treatment fluid comprising a gelling agent that comprises a polyvalent metal salt of an organophosphonic acid ester or a polyvalent metal salt of an organophosphinic acid, and treating the subterranean formation with the gelled liquid hydrocarbon treatment fluid. Treating the subterranean formation may involve fracturing the subterranean formation, performing a sand control treatment (e.g., gravel packing), providing a plugging agent (e.g., pill), providing a well bore cleanup fluid, performing a viscous sweep, or providing an insulating fluid. U.S. Pat. No. 5,271,464 assigned to Halliburton Company, the relevant disclosure of which is incorporated by reference, describes providing a plugging agent with a gel. U.S. Pat. Nos. 4,473,408 and 4,003,393, both assigned to The Dow Chemical Company, the relevant disclosures of which are incorporated by reference, describe the use of organic gels for cleaning the interior of a pipeline. U.S. Pat. No. 5,034,139 assigned to Nalco Chemical Company, the relevant disclosure of which is incorporated by reference, describes the use of a thixotropic gel as a viscous sweep. U.S. Pat. No. 6,283,215 assigned to Institut Francais Du Petrole, the relevant disclosure of which is incorporated by reference, describes insulation of tubings placed in a well bore. In certain of such embodiments, the gelling agent that comprises a polyvalent metal salt of the organophosphonic acid ester or a polyvalent metal salt of an organophosphinic acid may be present in the treatment fluid in an amount in the range of from about 0.1% to about 10.0% w/v.

In a fracturing treatment fluid embodiment, a gelling agent comprising a polyvalent metal salt of an organophosphonic acid ester or a polyvalent metal salt of an organophosphinic acid may be added to the liquid hydrocarbon along with an activator composition that comprises a source of polyvalent metal ions to gel the liquid hydrocarbon. In certain embodiments, the polyvalent metal salt of the organophosphonic acid ester or the polyvalent metal salt of the organophosphinic acid may be added in an amount in the range of from about 0.1% to about 10% w/v. Optionally, a fracturing fluid of the present invention may comprise water and/or a base to achieve a desired gel. A fracturing fluid of the present invention also may comprise proppant. A preferred method of fracturing a subterranean formation in accordance with the present invention comprises the steps of: (a) providing a gelled liquid hydrocarbon treatment fluid comprising a gelling agent that comprises a polyvalent metal salt of an organophosphonic acid ester, the organophosphonic acid ester having the formula:

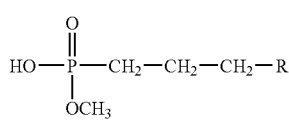

where R represents a hydrocarbon group having the general formula $C_nH_{2n+1}$, where n is from about 3 to about 21, or a polyvalent metal salt of an organophosphinic acid, organophosphinic acid having the formula:

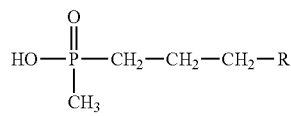

where R represents a linear or branched alkyl chain having the general formula $C_nH_{2n+1}$, where n is from about 3 to about 21; and (b) contacting the subterranean formation with the gelled liquid hydrocarbon treatment fluid under conditions effective to create or enhance at least one fracture in the subterranean formation. In certain embodiments, the gelling agent may be present in the treatment fluid in an amount in the range of from about 0.1% to about 5.0% w/v, more preferably in an amount in the range of from about 0.2% to about 2.5% w/v. In certain embodiments, the gelled liquid hydrocarbon treatment fluid may comprise a proppant material. In certain embodiments, the proppant material may be present in the fluid in an amount in the range of from about 1 to about 32 pounds of proppant material per gallon of liquid hydrocarbon, more preferably in the range of about 1 to about 22 pounds per gallon. As mentioned, if desired, water may be added if not otherwise present in the gelled liquid hydrocarbon treatment fluid, so that, e.g., a delayed gel breaker may be utilized. A suitable delayed gel breaker may be present in the treatment fluid in an amount in the range of from about 0.01% to about 3% w/v, more preferably in an amount in the range of from about 0.05% to about 1% w/v.

In a gravel pack treatment fluid embodiment, a gelling agent comprising a polyvalent metal salt of an organophosphonic acid ester or a polyvalent metal salt of an organophosphinic acid may be added to the liquid hydrocarbon in an amount in the range of from about 0.1% to about 10% w/v with a portion of gravel particulates. Optionally, a gravel pack treatment fluid of the present invention may comprise water and or a base to achieve a desired gel. A method of the present invention of providing sand control to a subterranean formation comprises the steps of contacting a portion of the subterranean formation with a gelled liquid hydrocarbon gravel pack fluid of the present invention that comprises gravel and a gelling agent that comprises a polyvalent metal salt of an organophosphonic acid ester or a polyvalent metal salt of an organophosphinic acid so as to create a gravel pack neighboring that portion of the subterranean formation. In certain embodiments, the gelling agent may be present in the gelled liquid hydrocarbon gravel pack fluid in an amount in the range of from about 0.1% to about 5.0% w/v, more preferably in an amount in the range of from about 0.2% to about 2.5% w/v. In certain embodiments, the gravel particulates may be present in the fluid in an amount in the range of from about 1 to about 32 pounds of proppant material per gallon of liquid hydrocarbon, more preferably in the range of about 1 to about 22 pounds per gallon. As mentioned, if desired, water may be added, if not otherwise present in gelled liquid hydrocarbon gravel pack fluid, so that, e.g., a delayed gel breaker may be utilized. A suitable delayed gel breaker may be present in the gelled liquid hydrocarbon gravel pack fluid in an amount in the range of from about 0.01% to about 10% w/v, more preferably in an amount in the range of from about 0.05% to about 3% w/v.

To facilitate a better understanding of the present invention, the following examples of certain aspects of some embodiments are given. In no way should the following examples be read to limit, or define, the scope of the invention.

EXAMPLES

Example 1

A number of monoesters of alkylphosphonic acids were prepared in the laboratory as follows: solid dodecylphosphonic acid monomethyl ester, solid tetradecylphosphonic acid monomethyl ester, solid hexadecylphosphonic acid monomethyl ester, solid octadecylphosphonic acid monomethyl ester, solid $C_{20-24}$ phosphonic acid monomethyl ester, solid octadecylphosphonic acid monobutyl ester, liquid octylphosphonic acid monomethyl ester and liquid decylphosphonic acid monomethyl ester.

The following laboratory procedure was utilized in the preparation of the above listed esters. Alkylphosphonic acid dimethyl (or dibutyl) esters were first prepared by charging a 250 milliliter three-necked round bottom flask with 0.2 mole of 1-alkene and 0.5 mole of dimethyl or dibutyl phosphite. The flask was fitted with a reflux condenser, thermometer, temperature controller, septum stopper and nitrogen purge. The mixture was magnetically stirred and heated to 150° C. or the boiling point of the 1-alkene, whichever was lower. 2.5 milliliters of t-butyl peroxide was slowly added with a syringe over the course of 1 hour. The mixture was heated at 150° C. for another 1.5 hours. The excess dialkyl phosphite was removed using vacuum distillation.

The following laboratory procedure was utilized in the preparation of monomethyl (or monobutyl) esters that are liquids at room temperature. That is, alkylphosphonic acid monomethyl (or monobutyl) esters were prepared using the alkylphosphonic acid dimethyl (or dibutyl) esters prepared in accordance with the above described procedure as follows. 0.045 mole of alkylphosphonic acid dimethyl (or dibutyl) ester was charged to a 100 milliliter round bottom flask. A solution of 1.9 grams (0.048 mole) of sodium hydroxide in 38 milliliters of methanol was added to the flask and the flask was fitted with a reflux condenser. The mixture was stirred magnetically and heated to reflux for 3 hours. 10 milliliters of water and 50 milliliters of hexane were added, and the resulting mixture was shaken. The phases were separated, and the hexane layer containing the unreacted dimethyl (or dibutyl) ester was discarded. The aqueous layer was washed twice with 20 milliliter portions of hexane, and the hexane layer was discarded. 3.6 milliliters of 38% hydrochloric acid (0.045 mole) was added to the aqueous phase followed by 40 milliliters of water. The mixture was extracted 3 times with 20 milliliter portions of hexane. The combined organic fractions were washed with water and dried over anhydrous magnesium sulfate. The solvent was removed using a rotary evaporator. The alkylphosphonic acid monomethyl (or monobutyl) esters produced were liquids at room temperature.

Alkylphosphonic acid monoesters which are solids at room temperature also were prepared. These were the $C_{12}$ to $C_{24}$ alkyl phosphonic acid mono methyl esters. The following laboratory procedure was utilized. A 100 milliliter round bottom flask was charged with 0.05 mole of alkylphosphonic acid dimethyl ester, and the flask was warmed to melt the solid. A solution of 2.5 g (0.063 mole) of sodium hydroxide in 38 milliliters of methanol was added, and the flask was fitted with a reflux condenser. The mixture was stirred magnetically and heated to reflux for 3 hours. The flask was cooled, and 5 milliliters 38% hydrochloric acid (0.062 mole) was added, followed by the addition of 125 milliliters of water. The slurry was extracted into hexane. The hexane solution was washed with water, dried over anhydrous magnesium sulfate, and concentrated on a rotary evaporator. The product was allowed to recrystallize, then it was collected on a büchner funnel, washed with hexane, and air dried.

Example 2

A commercially available octylphosphonic acid monomethyl ester was obtained which contained 55-65% octylphosphonic acid monomethyl ester, 20-30% octylphosphonic acid and 10-20% octylphosphonic acid dimethyl ester. 2 milliliters of the commercial octylphosphonic acid monomethyl ester and 2 milliliters of a ferric iron activator commercially available from Clearwater Inc. of Pittsburgh, Pa. under the trade designation "HGA-65™" were added to 200 milliliters of kerosene. Initial cross-linking was observed after 20 seconds of stirring with an overhead stirrer. A strong cross-linked gel was observed after 1 minute.

This test shows that the organophosphonic acid ester may comprise portions of the phosphonic acid and the phosphonic acid dialkyl ester.

Example 3

2 milliliters of the commercially available octylphosphonic acid monomethyl ester described in Example 2 were added to 200 milliliters of kerosene along with a ferric iron activator composition. The ferric iron activator composition comprised 240 grams of deionized water, 60 grams of ferric sulfate pentahydrate and 33.3 grams of triethanolamine.

Upon mixing, the cross-linking reaction was slower than that observed in Example 2, but good cross-linking was observed after 2 to 3 minutes.

Example 4

The commercially available octylphosphonic acid monomethyl ester described in Example 2 was added to No. 2 off-road diesel oil along with a commercially available ferric iron cross-linking composition obtained from Ethox Chemicals, Inc. of Greenville, S.C. sold under the trade designation "EA-3™" (see U.S. Pat. No. 6,149,693 issued to Geib on Nov. 21, 2000). Three different mixtures were prepared having the quantities of components shown in Table I below. After mixing, each of the mixtures was placed in a Model 50 viscometer at 68° C. and the viscosities of the mixtures were observed over time. The results of these tests are given in Table I below.

TABLE I

Viscosities of Gelled Diesel Oil Using
Commercially Available Gelling Agent Components at 68° C.

| Time, | Viscosity, cp. @ 170/sec | | |
|---|---|---|---|
| Minutes | Mixture A[1] | Mixture B[2] | Mixture C[3] |
| 30 | 297 | 169 | 197 |
| 60 | 243 | 172 | 210 |
| 90 | 218 | 187 | 212 |
| 120 | 205 | 209 | 204 |
| 150 | 193 | 217 | 199 |
| 180 | 184 | 218 | 193 |
| 210 | 175 | 218 | 188 |
| 240 | 167 | 217 | 184 |

TABLE I-continued

Viscosities of Gelled Diesel Oil Using
Commercially Available Gelling Agent Components at 68° C.

| Time, | Viscosity, cp. @ 170/sec | | |
|---|---|---|---|
| Minutes | Mixture A[1] | Mixture B[2] | Mixture C[3] |
| 270 | 158 | 216 | 182 |
| 300 | 152 | 217 | — |

[1]Mixture A comprised 6 milliliters of commercially available Albright & Wilson "ITC ™-996" octylphosphonic acid monomethyl ester per liter of diesel oil and 5 milliliters of "ETHOX ™ EA-3" ferric iron activator composition per liter of diesel oil.
[2]Mixture B comprised 5 milliliters of commercially available Albright & Wilson "ITC ™-996" octylphosphonic acid monomethyl ester per liter of diesel oil and 5 milliliters of "ETHOX ™ EA-3" ferric iron activator composition per liter of diesel oil.
[3]Mixture C comprised 5 milliliters of commercially available Albright & Wilson "ITC ™-996" octylphosphonic acid monomethyl ester per liter of diesel oil and 6 milliliters of "ETHOX ™ EA-3" ferric iron activator composition per liter of diesel oil.

From Table I, it can be seen that the commercially available octylphosphonic acid monomethyl ester and activator produced viscous fluids.

Example 5

The procedure of Example 4 was repeated except that the octylphosphonic acid monomethyl ester was synthesized in accordance with the procedure set forth in Example 1 and the third mixture tested, i.e., mixture F, included magnesium oxide breaker. The results of these tests are given in Table II below.

TABLE II

Viscosities of Gelled Diesel Oil Using
Synthesized Octylphosphonic Acid Monomethyl Ester
and Commercial Ferric Iron Activator Composition at 68° C.

| Time, | Viscosity, cp. @ 170/sec | | |
|---|---|---|---|
| Minutes | Mixture D[1] | Mixture E[2] | Mixture F[3] |
| 4 | 299 | 388 | 395 |
| 30 | 131 | 143 | 85 |
| 60 | 135 | 146 | 47 |
| 90 | 140 | 151 | 34 |
| 120 | 146 | 156 | 25 |
| 150 | 149 | 160 | 17 |
| 180 | — | 162 | 10 |
| 210 | — | 163 | — |
| 240 | — | 164 | — |

[1]Mixture D comprised 5 milliliters of synthesized octylphosphonic acid monomethyl ester per liter of diesel oil and 5 milliliters of "ETHOX ™ EA-3" ferric iron activator composition per liter of diesel oil.
[2]Mixture E comprised 5 milliliters of synthesized octylphosphonic acid monomethyl ester per liter of diesel oil and 6 milliliters of "ETHOX ™ EA-3" ferric iron activator composition per liter of diesel oil.
[3]Mixture F comprised 5 milliliters of synthesized octylphosphonic acid monomethyl ester per liter of diesel oil, 5 milliliters of "ETHOX ™ EA-3" ferric iron activator composition per liter of diesel oil and 1.2 grams magnesium oxide breaker per liter of diesel oil.

From Table II, it can be seen that the synthesized octylphosphonic acid monomethyl ester produced gels. In addition, mixture F including magnesium oxide gel breaker showed an increased viscosity as a result of neutralization of the organophosphonic acid ester by the magnesium oxide breaker therein, after which the gel was broken.

Example 6

The procedure of Example 4 was repeated except that the organophosphonic acid ester used was synthesized hexadecylphosphonic acid monomethyl ester. The results of these tests are given in Table III set forth below.

TABLE III

Viscosities of Gelled Diesel Oil Using Synthesized Hexadecylphosphonic Acid Monomethyl Ester and Commercial Ferric Iron Activator Composition at 68° C.

| Time, minutes | Viscosity, cp. @ 170/sec | | | | | | | |
|---|---|---|---|---|---|---|---|---|
| | Mixture G[1] | Mixture H[2] | Mixture I[3] | Mixture J[4] | Mixture K[5] | Mixture L[6] | Mixture M[7] | Mixture N[8] |
| 3.5 | 36 | 121 | 70 | 162 | 107 | 179 | 235 | 292 |
| 30 | 145 | 199 | 190 | 183 | 165 | 177 | 175 | 186 |
| 60 | 171 | 176 | 169 | 195 | 166 | 187 | 172 | 181 |
| 90 | 177 | 186 | 169 | 208 | 167 | 192 | 173 | 177 |
| 120 | 187 | 197 | 175 | 213 | 169 | 194 | 174 | 172 |
| 150 | 189 | 203 | 179 | 218 | 175 | 200 | 178 | 176 |
| 180 | 191 | 209 | 189 | 221 | 181 | 202 | 178 | 174 |
| 195 | 193 | 209 | 190 | 222 | 181 | 203 | 181 | 174 |

[1]Mixture G comprised 0.02 M (6.4 g/L) synthesized hexadecylphosphonic acid monomethyl ester per liter of diesel oil and 4.0 milliliters of "ETHOX ™ EA-3" ferric iron activator composition per liter of diesel oil.
[2]Mixture H comprised 0.02 M (6.4 g/L) synthesized hexadecylphosphonic acid monomethyl ester per liter of diesel oil and 5.0 milliliters of "ETHOX ™ EA-3" ferric iron activator composition per liter of diesel oil.
[3]Mixture I comprised 0.02 M (6.4 g/L) synthesized hexadecylphosphonic acid monomethyl ester per liter of diesel oil and 5.5 milliliters of "ETHOX ™ EA-3" ferric iron activator composition per liter of diesel oil.
[4]Mixture J comprised 0.02 M (6.4 g/L) synthesized hexadecylphosphonic acid monomethyl ester per liter of diesel oil and 6.0 milliliters of "ETHOX ™ EA-3" ferric iron activator composition per liter of diesel oil.
[5]Mixture K comprised 0.02 M (6.4 g/L) synthesized hexadecylphosphonic acid monomethyl ester per liter of diesel oil and 6.5 milliliters of "ETHOX ™ EA-3" ferric iron activator composition per liter of diesel oil.
[6]Mixture L comprised 0.02 M (6.4 g/L) synthesized hexadecylphosphonic acid monomethyl ester per liter of diesel oil and 7.0 milliliters of "ETHOX ™ EA-3" ferric iron activator composition per liter of diesel oil.
[7]Mixture M comprised 0.02 M (6.4 g/L) synthesized hexadecylphosphonic acid monomethyl ester per liter of diesel oil and 9.0 milliliters of "ETHOX ™ EA-3" ferric iron activator composition per liter of diesel oil.
[8]Mixture N comprised 0.02 M (6.4 g/L) synthesized hexadecylphosphonic acid monomethyl ester per liter of diesel oil and 11.0 milliliters of "ETHOX ™ EA-3" ferric iron activator composition per liter of diesel oil.

From Table III, it can be seen that synthesized hexadecylphosphonic acid monomethyl ester and the ferric iron activator utilized form gels in diesel oil at 68° C.

Example 7

The test procedure of Example 4 was repeated except that synthesized octadecylphosphonic acid monomethyl ester was utilized, the temperature of the gelled diesel oil was increased over time and two of the four gelled mixtures tested contained a magnesium oxide breaker. The results of these tests are given in Table IV below.

Further, the magnesium oxide breaker neutralized the acid ester which increased the viscosity attained over a broad range of temperatures.

Example 8

The test procedure of Example 4 was repeated except that a Tempco Rheo-15 rheometer was utilized to measure apparent viscosities at various temperatures with fluids containing 40% $CO_2$ by volume. One of the test mixtures was formed

TABLE IV

Viscosities of Gelled Diesel Oil Using Synthesized Octadecylphosphonic Acid Monomethyl Ester and Commercial Ferric Iron Activator Composition at Various Temperatures

| Time, minutes | Mixture O[1] | | Mixture P[2] | | Mixture Q[3] | | Mixture R[4] | |
|---|---|---|---|---|---|---|---|---|
| | Temp., ° C. | Viscosity, cp. @ 170/sec | Temp., ° C. | Viscosity, cp. @ 170/sec | Temp., ° C. | Viscosity, cp. @ 170/sec | Temp., ° C. | Viscosity, cp. @ 170/sec |
| 0 | 33 | 236 | 32 | 165 | 26 | 210 | 27 | 260 |
| 30 | 66 | 243 | 66 | 200 | 67 | 245 | 55 | 295 |
| 60 | 67 | 247 | 68 | 220 | 68 | 250 | 88 | 320 |
| 90 | 67 | 247 | 68 | 222 | 68 | 253 | 117 | 355 |
| 120 | 67 | 247 | 68 | 227 | 68 | 255 | 141 | 375 |
| 150 | 86 | 254 | 85 | 265 | 86 | 280 | 145 | 390 |
| 180 | 132 | 44 | 129 | 60 | 131 | 45 | 152 | 310 |
| 210 | 145 | 37 | 145 | 42 | 145 | 35 | 162 | 150 |
| 240 | 146 | 36 | 146 | 42 | 146 | 32 | 173 | 27 |
| 270 | — | — | — | — | — | — | 174 | 16 |
| 300 | — | — | — | — | — | — | 183 | 15 |
| 330 | — | — | — | — | — | — | 193 | 14 |

[1]Mixture O comprised 0.02 M (7 g/L) synthesized octadecylphosphonic acid monomethyl ester per liter of diesel oil and 5 milliliters of "ETHOX ™ EA-3" ferric iron activator composition per liter of diesel oil.
[2]Mixture P comprised 0.02 M (7 g/L) synthesized octadecylphosphonic acid monomethyl ester per liter of diesel oil, 5 milliliters of "ETHOX ™ EA-3" ferric iron activator composition per liter of diesel oil and 0.24 grams of magnesium oxide breaker per liter of diesel oil.
[3]Mixture Q comprised 0.02 M (7 g/L) synthesized octadecylphosphonic acid monomethyl ester per liter of diesel oil and 6 milliliters of "ETHOX ™ EA-3" ferric iron activator composition per liter of diesel oil.
[4]Mixture R comprised 0.04 M (14 g/L) synthesized octadecylphosphonic acid monomethyl ester per liter of diesel oil, 12 milliliters of "ETHOX ™ EA-3" ferric iron activator composition per liter of diesel oil and 0.48 grams of magnesium oxide breaker per liter of diesel oil.

As can be seen from Table IV, synthesized octadecylphosphonic acid monomethyl ester and the ferric iron activator utilized form gels in diesel oil over a broad temperature range.

with a #2 Off Road Diesel hydrocarbon fluid, and another test mixture included magnesium oxide. The results of these tests are set forth in Table V below.

TABLE V

Viscosities of Gelled Diesel Using Commercially Available Gelling Agent Components and 40% Carbon Dioxide by Volume at Various Temperatures

| Time, minutes | Mixture S[1] Temp., °C. | Mixture S[1] Viscosity, cp. @ 170/sec | Mixture T[2] Temp., °C. | Mixture T[2] Viscosity, cp. @ 170/sec | Mixture U[3] Temp., °C. | Mixture U[3] Viscosity, cp. @ 170/sec |
|---|---|---|---|---|---|---|
| 0   | 10 | 120 | 7   | 120 | 7  | 100 |
| 10  | 66 | 155 | 52  | 195 | 60 | 295 |
| 20  | 85 | 115 | 66  | 205 | 63 | 330 |
| 30  | 85 | 95  | 68  | 195 | 66 | 340 |
| 40  | 85 | 85  | 71  | 190 | 68 | 345 |
| 50  | 85 | 85  | 74  | 175 | 71 | 350 |
| 60  | 85 | 85  | 77  | 165 | 72 | 350 |
| 70  | —  | —   | 82  | 145 | 74 | 340 |
| 80  | —  | —   | 85  | 130 | 77 | 335 |
| 90  | —  | —   | 88  | 110 | 79 | 320 |
| 100 | —  | —   | 91  | 90  | 85 | 315 |
| 110 | —  | —   | 93  | 80  | 88 | 300 |
| 120 | —  | —   | 96  | 65  | 90 | 285 |
| 130 | —  | —   | 99  | 45  | 91 | 265 |
| 140 | —  | —   | 102 | 35  | 93 | 240 |
| 150 | —  | —   | 104 | 20  | 96 | 210 |

[1]Mixture S comprised 5 milliliters of commercially available Albright & Wilson "ITC ™-966" octylphosphonic acid monomethyl ester per liter of #2 Off Road Diesel Fuel containing 40% by volume carbon dioxide and 5 milliliters of Ethox "EA-3 ™" ferric iron activator composition per liter of #2 Off Road Diesel Fuel containing 40% by volume carbon dioxide.
[2]Mixture T comprised 7 milliliters of commercially available Albright & Wilson "ITC ™-966" octylphosphonic acid monomethyl ester per liter of diesel oil containing 40% by volume carbon dioxide and 7 milliliters of Ethox "EA-3 ™" ferric iron activator composition per liter of diesel oil containing 40% by volume carbon dioxide.
[3]Mixture U comprised 7 milliliters of commercially available Albright & Wilson "ITC ™-966" octylphosphonic acid monomethyl ester per liter of #2 Off Road Diesel Fuel containing 40% by volume carbon dioxide, 7 milliliters of Ethox "EA-3 ™" ferric iron activator composition per liter of #2 Off Road Diesel Fuel containing 40% by volume carbon dioxide and 0.240 grams of magnesium oxide breaker per liter of diesel oil containing 40% by volume carbon dioxide.

From Table V, it can be seen that gels were formed even though the gels contained 40% by volume carbon dioxide. Also, a significant increase in viscosity was realized when the gel included only enough magnesium oxide breaker to partially neutralize the octylphosphonic acid monomethyl ester.

Example 9

The procedure described in Example 4 was repeated except that magnesium oxide breaker was included in the three mixtures that were tested. In addition, one of the gels was produced utilizing a hydrocarbon liquid commercially available from Trysol Corp. of Sundre, Alberta, Canada under the trade name "FRACSOL™" to which was added 40% by total volume carbon dioxide. The results of the tests are given in VII below.

TABLE VI

Break Times of Various Gels with Magnesium Oxide

| Time, minutes | Mixture V[1] Temp., °C. | Mixture V[1] Viscosity, cp. @ 170/sec | Mixture W[2] Temp., °C. | Mixture W[2] Viscosity, cp. @ 170/sec | Mixture X[3] Temp., °C. | Mixture X[3] Viscosity, cp. @ 170/sec |
|---|---|---|---|---|---|---|
| 5   | 31 | 366 | 33 | 375 | 39 | 370 |
| 10  | 46 | 365 | 48 | 307 | 68 | 365 |
| 15  | 54 | 365 | 55 | 240 | 85 | 360 |
| 20  | 59 | 364 | 58 | 173 | 85 | 200 |
| 25  | 62 | 363 | 61 | 105 | 85 | 70  |
| 30  | 64 | 360 | 62 | 83  | 85 | 30  |
| 35  | 65 | 357 | 64 | 76  | 85 | 15  |
| 40  | 66 | 353 | 65 | 67  | 85 | 13  |
| 45  | 67 | 335 | 65 | 62  | 85 | 10  |
| 50  | 67 | 318 | 66 | 56  | 85 | 9   |
| 55  | 67 | 302 | 66 | 51  | 85 | 5   |
| 60  | 68 | 293 | 66 | 47  | 85 | 2   |
| 90  | 68 | 185 | 66 | 34  |    |     |
| 120 | 68 | 97  | 67 | 25  |    |     |
| 150 | 68 | 74  | 67 | 17  |    |     |

TABLE VI-continued

Break Times of Various Gels with Magnesium Oxide

| Time, minutes | Mixture V[1] | | Mixture W[2] | | Mixture X[3] | |
|---|---|---|---|---|---|---|
| | Temp., °C. | Viscosity, cp. @ 170/sec | Temp., °C. | Viscosity, cp. @ 170/sec | Temp., °C. | Viscosity, cp. @ 170/sec |
| 180 | 68 | 67 | 67 | 11 | | |
| 210 | 68 | 60 | | | | |
| 240 | 68 | 54 | | | | |
| 270 | 68 | 47 | | | | |
| 300 | 68 | 35 | | | | |
| 330 | 68 | 25 | | | | |
| 360 | 68 | 18 | | | | |
| 390 | 68 | 14 | | | | |
| 420 | 68 | 12 | | | | |

[1]Mixture V comprised 5 milliliters of commercially available Albright & Wilson "ITC ™-966" octylphosphonic acid monomethyl ester per liter of off-road diesel oil, 5 milliliters of Ethox "EA-3 ™" ferric iron activator composition per liter of off-road diesel oil and 2.4 grams of magnesium oxide breaker per liter of off-road diesel oil. The off-road diesel oil contained water.
[2]Mixture W comprised 5 milliliters of synthesized octylphosphonic acid monomethyl ester per liter of off-road diesel oil, 5 milliliters of Ethox "EA-3 ™" ferric iron activator composition per liter of off-road diesel oil and 1.2 grams of magnesium oxide breaker per liter of off-road diesel oil. The off-road diesel oil contained water.
[3]Mixture X comprised 7 milliliters of commercially available Albright & Wilson "ITC ™-966" octylphosphonic acid monomethyl ester per liter of "FRACSOL ™" hydrocarbon liquid mixed with 40% by volume carbon dioxide, 7 milliliters of Ethox "EA-3 ™" ferric iron activator composition per liter of "FRACSOL ™" hydrocarbon liquid mixed with 40% by volume carbon dioxide and 1.1 grams of magnesium oxide breaker per liter of "FRACSOL ™" hydrocarbon liquid mixed with 40% by volume carbon dioxide. Mixture X also contained water.

From Table VII, it can be seen that progressive breaks were obtained by the presence of the magnesium oxide. The synthesized organophosphonic acid ester required significantly less breaker and still showed a faster break rate than the commercial organophosphonic acid ester. The gel containing 60% by volume "FRACSOL™" hydrocarbon liquid and 40% by volume carbon dioxide also achieved a progressive and complete break as a result of the presence of the magnesium oxide.

Example 10

Gelled hydrocarbon liquid test samples were prepared by combining 0.02M (6.4 g/L) of hexadecylphosphonic acid monomethyl ester and 5 milliliters per liter of Ethox "EA-3™" ferric iron activator composition. Various reducing agents for reducing ferric iron to ferrous iron and thereby breaking the gels were added to the test samples. Thereafter, the viscosities of the test samples over time were measured to determine the effectiveness of the reducing agents in breaking the gels. The results of these tests are given in Table VIII below.

TABLE VII

Break Times of Diesel Oil Gel[1]
Containing Various Reducing Agents @ 90° C.

| Reducing Agent Used | Viscosity, cp. @ 170/sec At Time | | | | |
|---|---|---|---|---|---|
| | 0 | 2 hrs. | 21 hrs. | 45 hrs. | 242 hrs. |
| Blank - No Reducing Agent | 60 | 66 | 66 | 66 | 66 |
| Stannous Chloride dihydrate | 7 | 3 | — | — | — |
| Thioglycolic Acid | 45 | 3 | — | — | — |
| Sodium Diethyldithiocarbamate | 141 | 18 | 3 | — | — |
| Sodium Dimethyldithiocarbamate | 123 | 42 | 30 | 3 | — |
| Hydrazine Sulfate | 45 | 96 | 57 | 33 | 3 |
| Hydroxylamine Hydrochloride | 75 | 69 | 15 | 3 | — |

[1]0.02M (0.64 wt %) hexadecyl phosphonic acid monomethyl ester per liter of off-road diesel oil, 5 milliliters of Ethox "EA-3 ™" ferric iron activator composition per liter of off-road diesel oil and 0.01 M reducing agent per liter of off-road diesel oil. [0.1 Molar for stannous chloride dihydrate = 22.56 g/L; 0.1 M for thioglycolic acid (mercaptoacetic acid) = 9.21 g/L; 0.1 M for sodiumdiethyldithiocarbamate = 22.53 g/L; 0.1 M for sodium dimethyldithiocarbamate = 14.32 g/L; 0.1 m hydroxylamine hydrochloride = 6.95 g/L] The off-road diesel oil gels contained water.

From Table VIII, it can be seen that reducing agents comprised of stannous chloride, thioglycolic acid, sodium diethyldithiocarbamate, sodium dimethyldithiocarbamate and hydrazine sulfate can be utilized as efficient reducing agent breakers for the hydrocarbon gels of this invention, at 90° C.

Additional reducing agents could be the preferred reducing agents at higher temperatures where a slower rate of reaction is required. The additional reducing agents include, but are not limited to, sodium hypophosphite, potassium iodide, 2-mercaptoethanol (thioglycol), ascorbic acid, sodium thiosulfate, sodium dithionite, sodium sulfite and salts thereof.

Example 11

To demonstrate an improved synthesis procedure using an octadecylphosphonic acid, mono methyl ester as a specific example, a 500 ml round bottom flask was charged with 0.3 moles of octadecylphosphonic acid, dimethyl ester, 225 ml of methanol, and 15 g of sodium hydroxide. The flask was fitted with a reflux condenser and stirred magnetically while heating to reflux for 30 hours. The mixture was transferred to a 1 liter beaker and allowed to cool. While stirring, 31 ml of concentrated hydrochloric acid was added, followed immediately by 500 ml of water. The mixture was heated to fuse the solid and then cooled to ambient temperature. The solid product was removed from the beaker, dissolved in 250 ml of hexanes, and dried over anhydrous magnesium sulfate. The solvent was removed using a rotary evaporator to give the crude product in a 97% yield (94% monoester by $^{31}$P NMR). If desired, the crude product could be further purified by recrystallization from hexanes.

For esters other than methyl, a similar procedure may be used with the methanol replaced with the alcohol consistent with the ester (e.g., n-butanol with the dibutyl ester, isopropanol with the diisopropyl ester, etc.). Due to the high boiling points of these alcohols as compared to methanol, the reaction times may be reduced. By using the appropriate alcohol, product purity may be improved possibly by avoiding transesterification with the methanol solvent.

Example 12

This example demonstrates the effect of a base on gelation performance. In this example, tris(methyl hexadecanephosphonate) iron(III) was synthesized from hexadecanephosphonic acid, dimethyl ester with a procedure similar to that described in:
J. J. Kokalas, D. N. Kramer, F. Block, R. Levin, "The Infrared Spectra of Tris(methyl methylphosphonate) iron(III), tris(ethyl ethylphosphonate) iron(III), and tris(isopropyl methylphosphonate) iron(III)," *Spectroscopy Letters,* 1969, 2, 273-281. Without isolating the tris(methylhexadecylphosphonate) iron(III) from the reaction mixture, the crude product was added to Norpar 12 (alkane mixture, predominately $C_{12}$) to give a 15 mM concentration of the iron complex. Rheology was determined using a constant frequency (1 Hz) oscillatory stress sweep on a Haake Rheostress RS150 rheometer fitted with a 60 mm diameter. It had a 2 cone and plate configuration. The rheology was then measured after adding 0.4% v/v water to the solution. The rheology was again measured after adding 0.4% v/v of 25% w/w sodium hydroxide. According to the measurements taken, the storage modulus, G', is low (which indicates a weak gel) until the sodium hydroxide is added. The large increase in G' is consistent with a strong gel.

TABLE VIII

Effect of Water and Base on G'

| Stress (Pa) | G'(Pa) | | |
|---|---|---|---|
| | No Water | 0.4% Water | 0.4% Water + 0.4% 25% NaOH |
| 1.0 | 6.7 | 7.3 | 87 |
| 10.7 | 6.5 | 7.5 | 87 |

Thus, the present invention is well adapted to carry out the objects and attain the benefits and advantages mentioned as well as those which are inherent therein. While numerous changes to the methods and compositions can be made by those skilled in the art, such changes are encompassed within the spirit of this invention as defined by the appended claims.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
providing a gelled liquid hydrocarbon treatment fluid comprising a liquid hydrocarbon and a gelling agent that comprises a polyvalent metal salt of an organophosphinic acid, wherein the polyvalent metal salt of an organophosphinic acid is formed from a reaction of an activator composition that comprises a source of polyvalent metal ions and an organophosphinic acid, the organophosphinic acid having the formula:

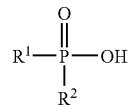

wherein $R^1$ or $R^2$ is a hydrocarbon group having about 1 to about 30 carbon atoms that comprises a linear or branched alkyl, alkenyl, aryl, alkylaryl, arylalkyl, cycloalkyl, alkyl ether, aryl ether, alkyl aryl ether, or a mixture thereof; and $R^1$ or $R^2$ is a hydrocarbon group having from about 1 to about 6 carbon atoms; and
treating a portion of a subterranean formation with the gelled liquid hydrocarbon treatment fluid.

2. The method of claim 1 wherein the liquid hydrocarbon is selected from the group consisting of α-olefins, internal olefins, alkanes, aromatic solvents, cycloalkanes, liquefied petroleum gas, kerosene, diesel oil, gas oil, fuel oil, petroleum distillates, crude oil mixtures, and mixtures thereof.

3. The method of claim 1 wherein the liquid hydrocarbon is designed for use with $CO_2$.

4. The method of claim 1 wherein the source of polyvalent metal ions is selected from the group consisting of aluminum ions, gallium ions, lanthanum ions, ruthenium ions, iron ions, lanthanide rare earth series ions, and combinations thereof.

5. The method of claim 4 wherein the polyvalent metal ions comprise ions having a +3 oxidation state.

6. The method of claim 1 wherein the gelled liquid hydrocarbon treatment fluid further comprises a surfactant.

7. The method of claim 1 wherein the gelled liquid hydrocarbon treatment fluid further comprises an enhancer that provides at least some alkalinity to the gelled liquid hydrocarbon treatment fluid.

8. The method of claim 7 wherein the enhancer comprises a compound having the general formula $C_nH_mO_xN_y$, wherein n is from about 1 to about 50, m is from about 0 to about the number necessary to satisfy the valence of the enhancer, x is from about 1 to about 10, and y is from about 0 to about 10.

9. The method of claim 1 wherein the gelled liquid hydrocarbon treatment fluid further comprises water, the water being present in an amount of at least about 0.05% of the total treatment fluid volume.

10. The method of claim 1 wherein the gelled liquid hydrocarbon treatment fluid further comprises a breaker, the breaker being present in an amount sufficient to reduce the viscosity of the gelled liquid hydrocarbon treatment fluid at a desired time.

11. The method of claim 10 wherein the breaker is selected from the group consisting of hard burned magnesium oxide, alkali metal carbonates, alkali metal bicarbonates, alkali metal acetates, alkaline earth metal oxides, alkali metal hydroxides, amines, weak acids, reducing agents, and combinations thereof.

12. The method of claim 1 wherein treating the portion of the subterranean formation further comprises one or more events selected from the group consisting of: plugging the portion of the subterranean formation with the gelled liquid hydrocarbon treatment fluid, plugging a portion of a well bore penetrating the subterranean formation with the gelled liquid hydrocarbon treatment fluid, performing cleanup of a well bore with the gelled liquid hydrocarbon treatment fluid, performing a viscous sweep of the portion of the subterranean formation with the gelled liquid hydrocarbon treatment fluid, performing a viscous sweep of a portion of a well bore penetrating the subterranean formation, insulating the portion of the subterranean formation with the gelled liquid hydrocarbon treatment fluid, insulating a portion of a well bore penetrating the subterranean formation with the gelled liquid hydrocarbon treatment fluid, insulating a tubing placed in a well bore penetrating the subterranean formation with the gelled liquid hydrocarbon treatment fluid; and combinations thereof.

13. A method of fracturing a portion of a subterranean formation, the method comprising:
    providing a gelled liquid hydrocarbon fracturing fluid comprising a gelling agent that comprises a polyvalent metal salt of an organophosphinic acid wherein the polyvalent metal salt of an organophosphinic acid is formed from a reaction of an activator composition that comprises a source of polyvalent metal ions and an organophosphinic acid, the organophosphinic acid having the formula:

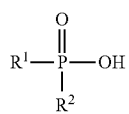

wherein $R^1$ or $R^2$ is a hydrocarbon group having about 1 to about 30 carbon atoms that comprises a linear or branched alkyl, alkenyl, aryl, alkylaryl, arylalkyl, cycloalkyl, alkyl ether, aryl ether, alkyl aryl ether, or a mixture thereof; and $R^1$ or $R^2$ is a hydrocarbon group having from about 1 to about 6 carbon atoms; and
    contacting the portion of the subterranean formation with the gelled liquid hydrocarbon fracturing fluid under conditions effective to create or enhance at least one fracture in the subterranean formation.

14. The method of claim 13 wherein the gelled liquid hydrocarbon fracturing fluid further comprises a proppant.

15. A method of providing sand control to a portion of a subterranean formation, the method comprising:
    providing a gelled liquid hydrocarbon gravel pack fluid that comprises gravel particulates and a gelling agent that comprises a polyvalent metal salt of an organophosphinic acid wherein the polyvalent metal salt of an organophosphinic acid is formed from a reaction of an activator composition that comprises a source of polyvalent metal ions and an organophosphinic acid, the organophosphinic acid having the formula:

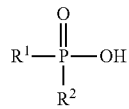

wherein $R^1$ or $R^2$ is a hydrocarbon group having about 1 to about 30 carbon atoms that comprises a linear or branched alkyl, alkenyl, aryl, alkylaryl, arylalkyl, cycloalkyl, alkyl ether, aryl ether, alkyl aryl ether, or a mixture thereof; and $R^1$ or $R^2$ is a hydrocarbon group having from about 1 to about 6 carbon atoms; and
    contacting the portion of the subterranean formation with the gelled liquid hydrocarbon gravel pack fluid so as to form a gravel pack near the portion of the subterranean formation.

16. A method comprising:
    providing a gelled liquid hydrocarbon treatment fluid comprising:
        a liquid hydrocarbon,
        a gelling agent comprising a polyvalent metal salt of an organophosphinic acid wherein the polyvalent metal salt of an organophosphinic acid is formed from a reaction of an activator composition that comprises a source of polyvalent metal ions and an organophosphinic acid, the organophosphinic acid having the formula:

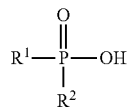

wherein $R^1$ or $R^2$ is a hydrocarbon group having about 1 to about 30 carbon atoms that comprises a linear or branched alkyl, alkenyl, aryl, alkylaryl, arylalkyl, cycloalkyl, alkyl ether, aryl ether, alkyl aryl ether, or a mixture thereof; and $R^1$ or $R^2$ is a hydrocarbon group having from about 1 to about 6 carbon atoms,
        a surfactant selected from the group consisting of imidazoline, fatty acid soaps, fatty acids, dioctyl sulphosuccinate, sodium alkyl benzene sulphonate, fatty acid esters, fatty acid alkanolamides, amido betaines, and combinations thereof, and
        an enhancer comprising a compound having the general formula $C_nH_mO_xN_y$, wherein n is from about 1 to about 50, m is from about 0 to about the number necessary to satisfy the valence of the enhancer, x is from about 1 to about 10, and y is from about 0 to about 10; and
    treating a portion of a subterranean formation with the gelled liquid hydrocarbon treatment fluid.

* * * * *